Aug. 18, 1970  E. C. FRANK ET AL  3,524,354
TRACKING SYSTEM FOR MOVING OBJECTS
Filed Dec. 19, 1967  4 Sheets-Sheet 1
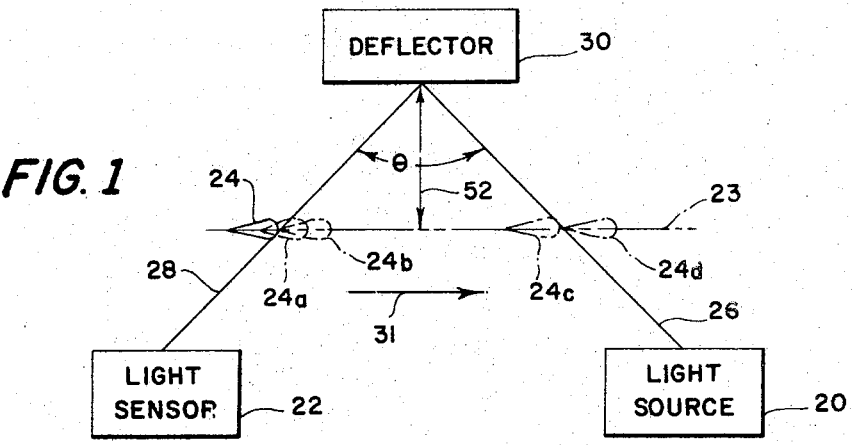
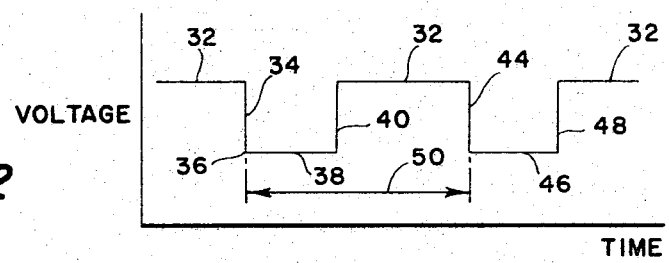
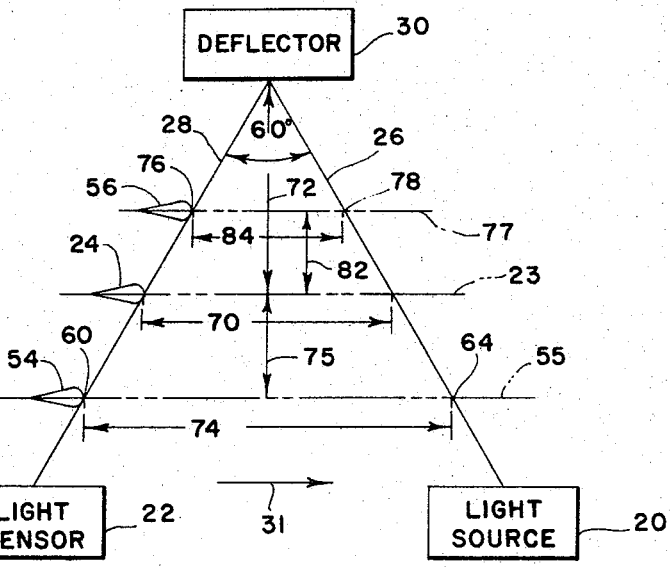
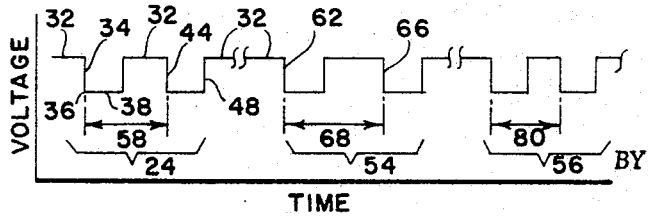
INVENTORS
EDWARD C. FRANK
MARTIN J. ROHNER
BY *Matthew P. Lynch*
ATTORNEY

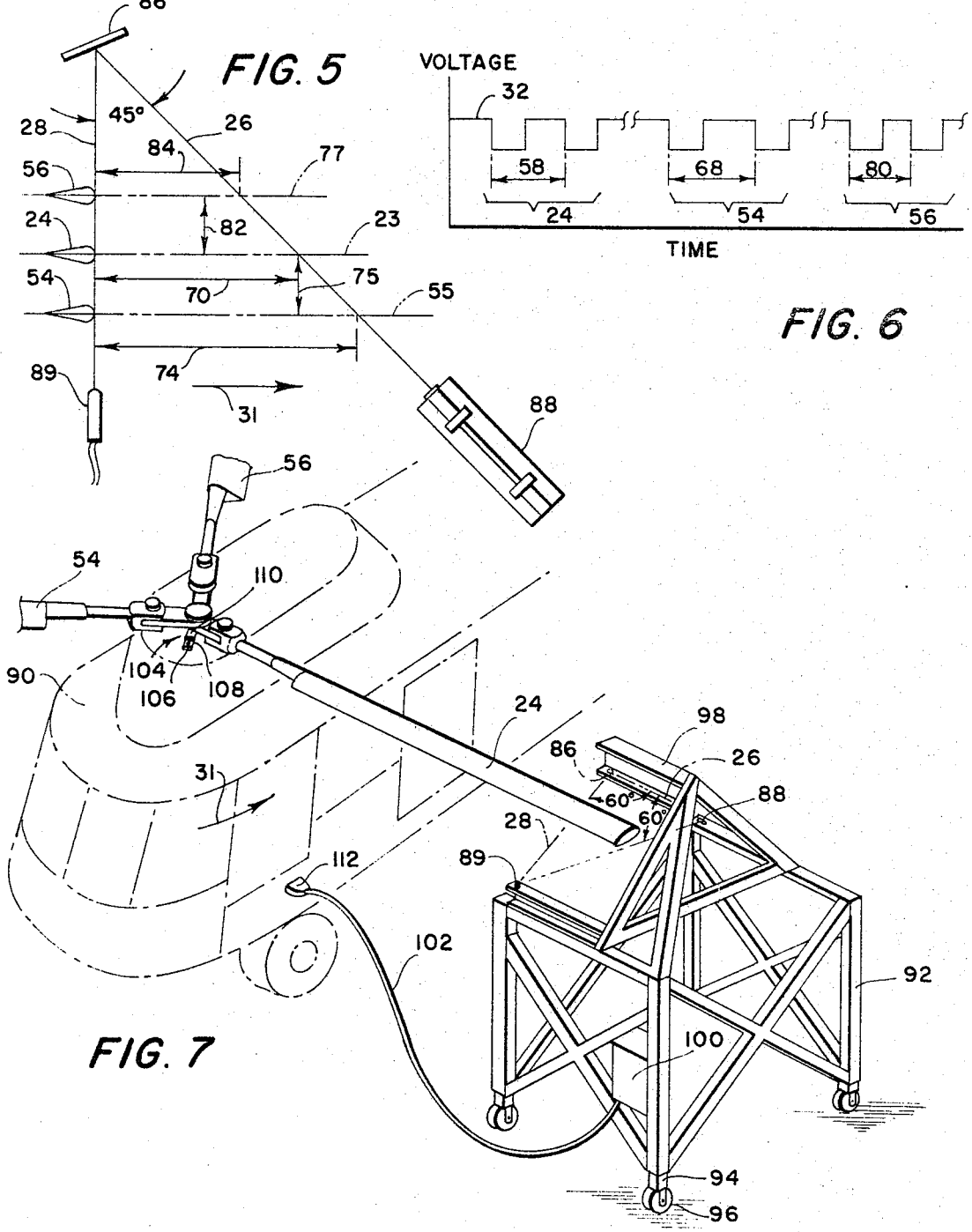

Aug. 18, 1970   E. C. FRANK ET AL   3,524,354
TRACKING SYSTEM FOR MOVING OBJECTS
Filed Dec. 19, 1967   4 Sheets-Sheet 3
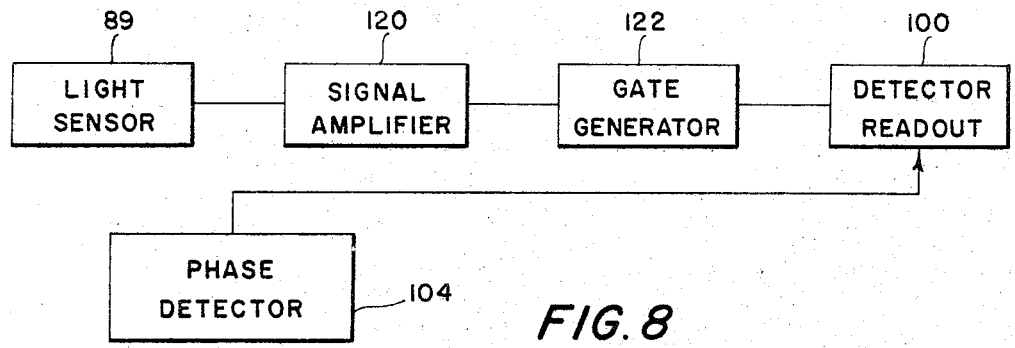
FIG. 8
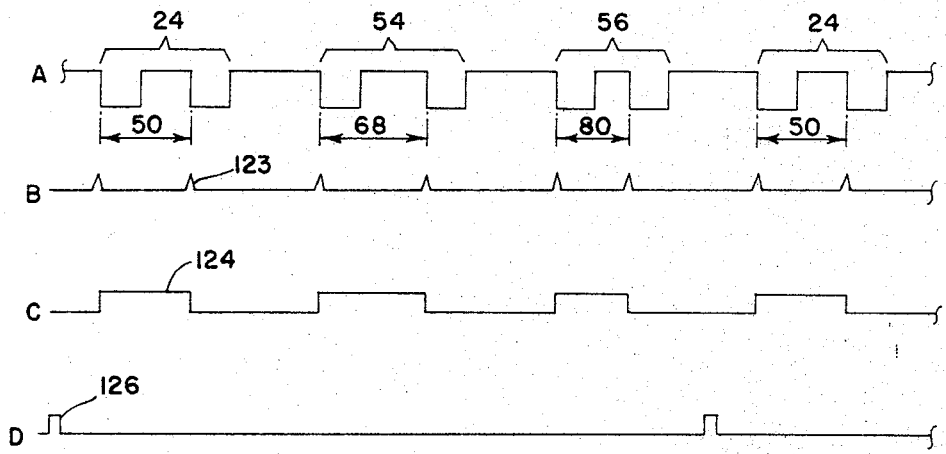
FIG. 9
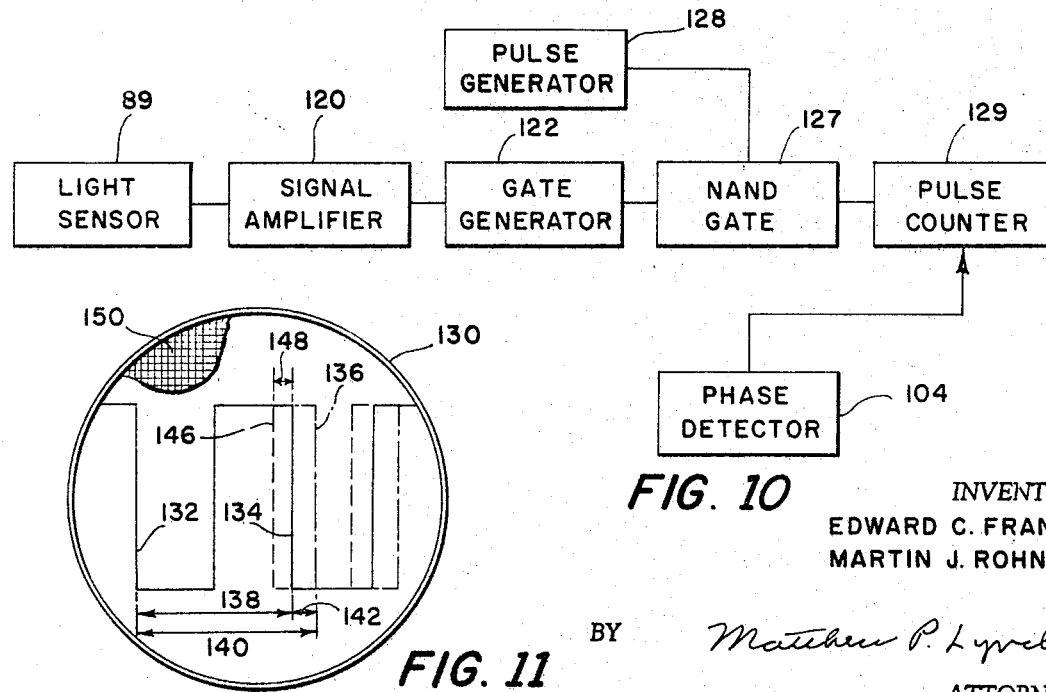
FIG. 10
FIG. 11
INVENTORS
EDWARD C. FRANK
MARTIN J. ROHNER
BY  Matthew P. Lynch
ATTORNEY United States Patent Office 3,524,354
Patented Aug. 18, 1970

3,524,354
TRACKING SYSTEM FOR MOVING OBJECTS
Edward C. Frank, Glenolden, and Martin J. Rohner, Springfield, Pa., assignors to The Boeing Company, Seattle, Wash., a corporation of Delaware
Continuation-in-part of application Ser. No. 605,699, Dec. 29, 1966. This application Dec. 19, 1967, Ser. No. 697,270
Int. Cl. G01m 1/00, 9/00
U.S. Cl. 73—455                                26 Claims

ABSTRACT OF THE DISCLOSURE

A system is provided for measuring the displacement characteristics of the path of a moving object with respect to an established plane of reference. The system directs two defined beams of energy, and more preferably coherent light beams, through the path of the moving object and at an angle to each other. At least one of the beams of energy is received by a light sensitive means, which means produces an electrical signal every time either light beam is interrupted by the moving object. The displacement characteristics of the moving object with respect to the plane of reference can be determined by measuring the elapsed time interval between sequential interruptions of the angularly disposed light beams by the object. The system is particularly useful in measuring the vertical displacement characteristics of the planes of rotation of rotating helicopter blades.

---

This application is a continuation-in-part of our copending application, Ser. No. 605,699, filed Dec. 29, 1966, now abandoned.

This invention relates to a system for determining the characteristics of an object in motion, and more particularly to a system for determining the displacement characteristics of the moving object with respect to an established plane of reference using defined beams of energy.

While the system of this invention may be used to determine the displacement characteristics of one or more of a variety of moving objects, it is particularly useful for determining the displacement characteristics of rotating helicopter blades. The system of this invention, therefore, will be described as it relates to the tracking of rotating blades, but it is to be understood that it is equally applicable to other moving objects that also describe a path or plane of movement.

It is necessary to determine the characteristics of rotating blades, and more particularly helicopter blades during actual rotation. Variations in the rotating characteristics of the blades create an unbalance in the rotor system of the helicopter leading to excessive and undesirable vibration during operation of the helicopter.

No two helicopter blades are exactly alike due to manufacturing variants, and the rotating characteristics of the blades can vary depending upon the physical structure of a particular blade, the material of which they are constructed, and the way in which the blades are mounted on the rotor. As the angular velocity of rotating blades increases, the blades pivot and tend to cone upwardly with the tip of each blade describing a specific plane or path of rotation. It is to be understood that the plane or path of rotation of the blades as used in the specification and claims is intended to refer to the plane or path described by a point at or near the tip of the whirling blades. The plane of rotation of each blade depends upon the characteristics of the blade, and an unbalance in the helicopter rotor system results when the blades describe different planes of rotation.

It is therefore necessary to adjust all of the blades so that the tip of each blade will describe a similar or common plane of rotation to prevent excessive vibration in the aircraft. This procedure is commonly referred to as "blade tracking" wherein the blades are tracked to determine their plane of rotation relative to an established plane of reference. All blades are then adjusted to rotate at a preselected plane of rotation or at the same distance from an established plane of reference so that all of the blades are said to be "in track."

Many systems have been developed in the past for tracking blades, and more particularly the rotor blades of helicopters. These systems include mechanical devices which come into actual physical contact with the blades to indicate a variance in the vertical displacement of a blade during rotation. For example, a tracking flag has been used wherein a flag or similar member is mounted adjacent the plane of rotation of a blade and is marked by chalk on the tip of the blade as it comes into contact with the flag. The height of the chalk mark on the flag indicates the relative position of the plane of rotation of the blade. While such devices are relatively simple, they are very inaccurate and are incapable of detecting minor deflections in the blades, which to the eye appear to be in perfect track. With the speeds now attainable in the rotation of helicopter blades, even minor differences between the paths of rotation of the blades can cause excessive, if not dangerous, vibration in the aircraft.

More recently, optical systems which avoid any contact with the blades have been developed in an effort to improve the accuracy of blade tracking. One such system provides an optical device which permits bundles of rays of ambient light from two directions to impinge upon a light sensitive element, such as a photoelectrical cell. These rays are disposed in the path of the rotating blades, and when the rays are progressively blocked by a passing blade, the light sensitive element emits a signal indicating the interruption of the rays by a blade. The signals from the light sensitive element are applied to an electronic circuit which records the time interval between two signals caused by the successive interruption of the pair of ambient light rays by any one blade.

Since the relative or parallax angle between the pair of ambient light rays is reasonably determinable and the speed of the rotor is constant, the time interval recorded by the electronic circuit is a function of the approximate height of the particular rotating blade with respect to a given plane of reference. All of the blades of the rotor system then can be adjusted until their paths of rotation record a similar and predetermined time interval, thereby placing all the blades approximately "in track" to prevent an unbalance in the helicopter rotor system.

The ambient light rays, however, are never completely blocked by a passing blade but are only progressively blocked, thus producing a variable electrical signal from the light sensitive element. Hence, it is not possible, utilizing ambient light rays, to indicate when in fact the blade has passed a finite reference line, and thus the effectiveness of such a device has been limited by this inherent inaccuracy.

Furthermore, such systems are dependent upon a source of light from the sun or sky for daylight operation, as the system makes use of and is dependent upon ambient light. Sunlight is variable, of course, and on cloudy days the amount of light available is often insufficient to generate the required change in the electrical signal. This necessitates the use of massive artificial light to provide the required amount of ambient illumination so meaningful readings can be obtained from the system. In times of extreme weather conditions, such as heavy fog, rain, or snow, even a large amount of artificial light is insufficient to provide the necessary ambient light conditions.

During nighttime operations, artificially created light is also used to provide the necessary light conditions for successful operation of the device. During such operation, an external light source is used to illuminate the blades, and therefore the electrical signal generated is the reverse of that generated during daytime operation, since the light sensitive element or cell is only activated when the blade is in the proper position to reflect the external light into the cell. Hence, the reflective properties of the blades, which are not designed for reflection, are a limiting factor in the accuracy of such a device. Attempts to improve the reflective properties have included the application or reflective coatings to the blades, but the whirling of the blades through all types of weather conditions causes the coatings to quickly erode or change their degree of reflectivity.

The dependency of such a system on surrounding light is not only a disadvantage in and of itself, but it also leads to inaccurate results as any sudden change in the intensity of the ambient light can activate the cell without an actual interruption of the ambient light rays by a blade. Thus, during daylight operation any sudden decrease in ambient light would cause a change in the electrical signal output and, correspondingly, any sudden increase in ambient light during nighttime operation will create an undesired change in the electrcal signal output of the photoelectric cell.

Accordingly, it is the primary object of this invention to provide a new and improved system for more accurately measuring the displacement characteristics of a moving object.

Another object of this invention is to provide a system for determining the displacement characteristics of a moving object using finely controlled beams of energy.

Yet another object of certain embodiments of this invention is to provide a new and improved blade tracking system for more accurately measuring the displacement characteristics of whirling blades.

Still another object of certain embodiments of this invention is to provide a tracking system for rotating blades which permits tracking under most weather conditions and at any time of the day or night.

A further object of certain embodiments of this invention is to provide a tracking system for determining the vertical displacement characteristics of rotating blades that is not dependent upon or affected by ambient light conditions.

Still a further object of certain embodiments of this invention is to provide a new and improved optical tracking system for indicating the vertical displacement characterstics of rotating blades using a finely controlled light beam capable of establishing a finite line of reference.

Still another object of certain embodiments of this invention is to provide an optical tracking system for rotating blades using a finely controlled and coherent beam of light of constant intensity that is capable of penetrating most weather conditions, including fog, snow, and smoke, without degradation or divergence over the distances required.

Still a further object of certain embodiments of this invention is to provide an optical tracking system using an artificial light that is independent of the reflectiveness of the blades being tracked.

Still a further object of certain embodiments of this invention is to provide an improved system for tracking whirling blades wherein the vertical displacement characteristics of the blades are determined by measuring the elapsed time interval between successive interruptions by any one blade of a pair of signal generating and defined energy beams.

Still a further object of certain embodiments of this invention is to provide an improved tracking system wherein the relative difference in the vertical displacement between a plurality of whirling blades is determined by measuring the difference in the elapsed intervals between energy beam interruptions by the blades.

Still a further object of certain embodiments of this invention is to provide a tracking system comprising a pair of angularly disposed signal generating energy beams wherein the difference in the linear distance between the beams at the point where they are interrupted by whirling blades is equal to the vertical distance between the blades.

Still a further object of certain embodiments of this invention is to provide a tracking system that is not affected by the lead or lag of the blades.

Still a further object of certain embodiments of this invention is to provide a tracking system which is capable of accurately tracking rotating blades within a shorter time than has heretofore been possible.

Still a further object of this invention is to provide a displacement measuring system that is inexpensive to manufacture and maintain, that is simplified in construction and operation, and that is extremely accurate and highly reliable.

Additional objects and advantages of the invention will be set forth in part in the description which follows, and in part will be obvious from this description or may be learned by practice of the invention, the objects and advantages being realized and attained by means of the methods, instrumentalities, and combinations that are particularly pointed out in the appended claims.

To achieve the foregoing objects and in accordance with the purpose of this invention, the system of this invention for measuring the displacement characteristics of the path of a moving object from an established plane of reference comprises a source of energy for transmitting a first defined energy beam through the path of movement of the object and means for transmitting a second defined energy beam through the path of movement at an angle to the first beam. At least one of the energy beams is received by energy responsive means that is responsive to interruptions of either energy beam by the moving object. Indicating means are provided for indicating the elapsed interval between interruptions of the two beams in sequence by the object as a function of the displacement characteristics of the path of the moving object with respect to the established plane of reference.

Furthermore, and in accordance with the purpose of this invention, the system of this invention comprises a method for indicating the displacement characteristics of a moving object from an established plane of reference, which comprises, directing a first defined energy beam through the path of movement of the object, directing a second defined energy beam through the path at an angle to the first beam. At least one of the energy beams is received by energy responsive means which indicates interruptions of either energy beam by the moving object. The interruptions are then plotted with time so that the interval between successive interruptions of the energy beams by the moving objects is a function of its displacement characteristics.

The system of this invention is particularly applicable to tracking rotating helicopter blades to determine their vertical displacement characteristics.

While any defined energy beam, including light and sound beams, is contemplated for use in the system of this invention, the preferred energy beam is a finely controlled and coherent beam of light. The invention, therefore, will be described as it relates to a light beam, but it is to be understood that other defined energy beams may also be used in the system of this invention.

The accompanying drawings which are incorporated in and constitute a part of this specification illustrate several embodiments of the invention, and together with this description, serve to explain the principles of this invention.

In the drawings:

FIG. 1 is a schematic view of the optical tracking system of this invention;

FIG. 2 is a diagrammatic illustration of the electrical impulse signals generated by the tracking system of FIG. 1;

FIG. 3 is a schematic view of a specific embodiment of the tracking system of this invention showing the relative position of the blades of a three-bladed rotor in an unbalanced position;

FIG. 4 is a diagrammatic illustration of the electrical signals generated by the system of FIG. 3;

FIG. 5 is a schematic view of another embodiment of the tracking system of this invention showing the relative position of the blades of a three-bladed rotor in an unbalanced position;

FIG. 6 is a diagrammatic illustration of the electrical signals generated by the system of FIG. 5;

FIG. 7 is a perspective illustration of the embodiment of the tracking system of FIG. 3 showing its relationship with respect to a helicopter;

FIG. 8 is a schematic block diagram representing one system for reading the electrical signals generated by the tracking system of this invention;

FIG. 9 is a diagrammatic illustration of the electrical signals generated by the tracking system of this invention and their integration into the readout system of FIG. 8;

FIG. 10 is a schematic block diagram representing an alternative embodiment for reading the signals generated by the tracking system of this invention for indicating the plane of rotation of a plurality of blades being tracked;

FIG. 11 is another alternative means for reading the electrical signals generated in the tracking system shown in FIG. 5;

Figure 12:
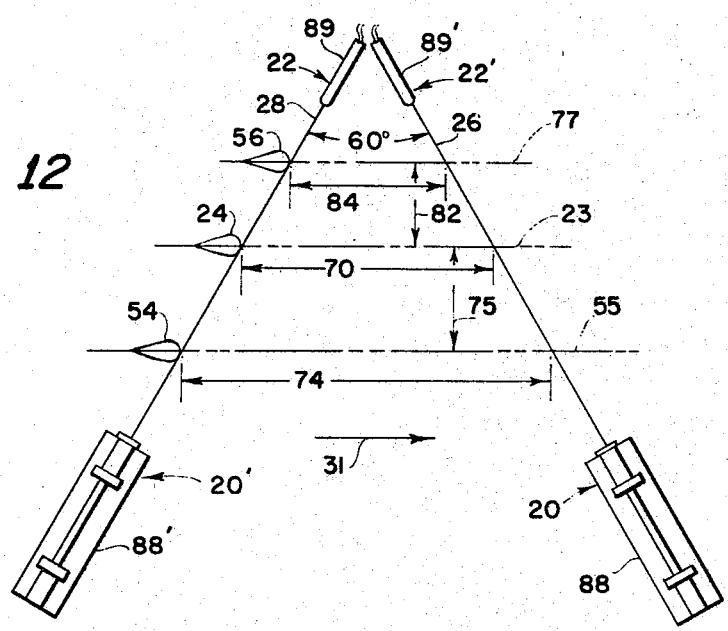
FIG. 12 is a schematic view of another embodiment of the tracking system of this invention showing the relative position of the blades of a three-bladed rotor in an unbalanced position.

It is to be understood that both the foregoing general description and the following detailed description are exemplary and explanatory but are not restrictive of the invention.

Reference will now be made in detail to the preferred embodiments of the invention, examples of which are illustrated in the accompanying drawings.

As shown in FIG. 1, one embodiment of the tracking system of this invention includes a light source 20 that projects upwardly a first light beam 26 through the path of rotation 23 of a whirling blade 24.

In accordance with this invention, means are provided for transmitting a second light beam through the path of rotation of the blade at an angle to first light beam 26. As here embodied, this means comprises a deflector 30 for deflecting light beam 26 to provide a second or deflected light beam 28, that is directed back through the path of rotation 23 of the blade at a predetermined angle θ between light beam 26 and deflected light beam 28.

In accordance with this invention, light sensitive means are provided for receiving at least one of the light beams, which means is responsive to interruptions of either light beam by whirling blade 24. As here embodied, this means comprises a light sensitive element 22 disposed on the same side of the path of rotation 23 of whirling blade 24 as light source 20. Light sensitive element 22 receives deflected light beam 28 and generates an electrical signal when the light beam impinges upon it.

As the leading edge of rotating blade 24 comes into the path of either light beam 26 or deflected light beam 28, depending upon the direction of rotation of the blades, light beam 28 will be interrupted and a change in the electrical signal from light sensitive element 22 will be generated.

Referring to FIG. 2, the signal change generated by light sensitive element 22 when the light beam is interrupted may be represented diagrammatically as a voltage drop 34 to an arbitrary level 36 from an otherwise constant voltage level 32 generated by the element when it is receiving the light. Assuming the blade is traveling in the direction of arrow 31 (FIG. 1), as the blade 24 interrupts deflected light beam 28 and continues to interrupt the light source (as shown in phantom at 24a in FIG. 1), the cutoff voltage level 36 may be represented by horizontal line 38. After the trailing edge of blade 24 has passed through the light beam (as shown in phantom at 24b in FIG. 1), the voltage returns to original voltage level 32 along line 40. With the blade now between light beams 26 and 28 and light sensitive element 22 receiving light beam 28, constant voltage level 32 remains until such time as the forward edge of the blade interrupts the first or primary light beam 26 (as shown in phantom at 24c in FIG. 1), causing a subsequent drop 44 in voltage. The line 46 represents an arbitrary level of cutoff voltage until the trailing edge of the blade passes beyond the beam 26 (as shown in phantom at 24d in FIG. 1) at which time the voltage again rises along a vertical line 48 to constant voltage level 32.

The time interval 50, as shown in FIG. 2, between the initial voltage drop 34 and the subsequent voltage drop 44 represents the time it took for the blade to travel between the ligth beams. Since the angle θ between primary light beam 26 and deflected light beam 28 and the speed of the rotor are constant, the time interval 50 is a function of the vertical displacement 52 between the plane of rotation 23 of the blade 24 and a fixed reference point, for example, beam deflector 30.

Rather than adjusting the blade to achieve a particular vertical displacement from a fixed reference point, such as the beam deflector, the blades of the rotor are more commonly tracked with respect to a preferred or optimum plane of rotation. This optimum reference plane may, for example, be the established plane of rotation of a master blade.

As shown in FIG. 3, wherein a specific embodiment of this invention is depicted, two rotor blades 54 and 56 are compared with an optimum plane of rotation 23 established by a blade 24. Hence, in comparison techniques with all blades rotating at the same speed, the difference in the time interval between interruptions of the light beams by a blade tracking at the preferred plane of rotation and a blade tracking at any other plane of rotation is a direct function of the vertical distance between the planes of rotation of the blades.

When beam deflector 30 is set so that θ is 60°, for example, thereby forming an equilateral triangle between beam deflector 30, light source 20 and light sensitive element 22, blade 24 will form the series of signal variations as diagrammatically illustrated in FIG. 4, in the same manner as that described above in FIG. 2. The time interval between beam interruptions is a distance 58 between the initial and subsequent dropoff in the voltage level of the cell.

Once the proper time interval 58 between beam interruptions has been established for the desired or optimum plane of rotation, such as that described by a master blade, the master blade may be removed and all of the blades of the rotor system can then be tracked with respect to this established plane of reference. For the sake of illustration, however, of the comparison of the planes of rotation of the individual blades, blade 24 is assumed to be tracking at the optimum or desired plane of rotation 23.

Assuming a three-bladed rotor system is being tested and the blade 54 tracks a plane of rotation 55 lower than the optimum plane of rotation 23 of blade 24, blade 54 interrupts deflected light beam 28 at 60 (FIG. 3). This interruption creates a similar change in the electrical signal from light sensitive element 22, represented by a voltage drop 62 diagrammatically illustrated in FIG. 4. As the blade transcends the distance 74 between the beams and intersects primary light beam 26 at 64, it causes a second change 66 in the signal level. It can be seen by reference to FIG. 4 that the time interval 68, between the initial and subsequent dropoff of the voltage, as represented by signal changes 62 and 66, respectively, for blade 54 is greater than the time interval 58 occurring at the optimum plane of rotation.

Since the light beams are angularly disposed, the difference in time interval not only indicates that blade 54 is out of track, but the increased time interval also indicates that the blade is taking longer to interrupt the light beams and therefore must be tracking below the optimum plane of rotation 23. From the difference between the time intervals 58 and 68, the distance 75 between the planes of rotation of the blades can be determined as follows:

Since the angle $\theta$ between the light beams is known, the linear distance of travel 70 (FIG. 3) between light beams 26 and 28 for blade 24, represented by time interval 58, is a function of the vertical distance 72 between beam deflector 30 and the plane of rotation 23 of blade 24. Thus, the vertical distance 72 is equal to one-half the linear distance 70 times cotan $\theta/2$, and if, for example, $\theta$ is 60°, as shown in the specific embodiment of FIG. 3, the vertical distance 72 is equal to one half the linear distance 70 times cotan 30°, or the square root of 3.

Therefore, the difference between the linear distance 74 of travel of blade 54 between the intersection of light beams 26 and 28, as represented by time interval 68, and the linear distance 70 of travel of blade 24, is a function of the vertical distance 75 between the plane of rotation of blade 54 and the optimum plane of rotation 23. Thus, for example, if $\theta$ is 60°, as shown in the specific embodiment of FIG. 3, the vertical distance 75 can be calculated as one half the difference between linear distance 70 for blade 24 and linear distance 74 for blade 54 times cotan 30°. Hence, the difference in the time intervals 58 and 68 between the two blades is a function of the vertical displacement characteristics of the blades.

If the third blade 56 is also out of track and, for example, forms a plane of rotation 77 above the optimum plane of rotation 23, it will intersect deflected light beam 28 at 76 and primary light beam 26 at 78 (FIG. 3), forming a similar time interval 80, as illustrated diagrammatically in FIG. 4, between the changes in voltage level as described above. In a similar manner, the vertical displacement 82 between the optimum plane of rotation 23 and the plane of rotation 77 of blade 56 can be determined as a function of the difference between the linear distance 84 between beam interruptions by blade 56 (represented by the time interval 80) and the linear distance 70 for blade 24 (represented by the time interval 58).

Once the vertical displacement characteristics of blades 54 and 56 have been determined, they may then be adjusted until the interval between successive interruptions of the light beams 26 and 28 is equal to the interval 58 for the optimum plane of rotation. When the intervals are identical, the blades are "in track," all having a common plane of rotation.

Suitable means are provided on the blades which can be adjusted to alter the balance of the blade, and hence to change its plane of rotation so as to bring them all into a common plane of rotation.

A further specific embodiment is illustrated in FIG. 5 showing a system similar to that illustrated in FIG. 3, wherein the angle $\theta$ is set at 45° and deflected beam 28 is directed normal to the planes of rotation of the blades. The change in signal levels generated by the light sensitive element is shown diagrammatically in FIG. 6. With blade 56 again describing a plane of rotation 77 vertically displaced above the optimum plane of rotation 23 described by blade 24, the time interval 80 between the initial and subsequent dropoff of the voltage for blade 56 is less than the time interval 58 for blade 24. With blade 54 describing a plane of rotation 55 vertically displaced below the optimum plane of rotation 23, the time interval 68 between the voltage drops is greater than the time interval 58 for blade 24. Hence, the vertical displacements 75 and 82 of blades 54 and 56, respectively, from the optimum plane of rotation 23 will be a function of the differences in time intervals between the blades and the blade 24, as descirbed above in connection with FIGS. 3 and 4.

Thus, for example, when $\theta$ is 45°, as shown in the specific embodiment of FIG. 5, the vertical displacement 75 between the optimum plane of rotation and the plane of rotation 55 of blade 54 is equal to the difference between linear distance 70 for blade 24 and linear distance 74 for blade 54.

While specific deflection angles of 45° and 60° have been described in FIGS. 3 and 5, and are preferred, it is to be understood that any included angle $\theta$ can be used between primary light beam 26 and deflected light beam 28 so long as the angle is sufficient to direct the deflected beam back through the plane of rotation of the blades.

In accordance with these embodiments of the invention, a deflector 30 is provided to deflect light beam 26 and send it back through the planes of rotation of the blades. This deflector can be a mirror 86 (FIG. 5) angularly positioned with respect to first or primary light beam 26 so that a line disecting the angle $\theta$ between the beams is normal to the plane of the mirror. It is to be understood that any other suitable deflectors may be used with these embodiments of the invention, such as a prism beam deflector or any equivalent deflector well known to those skilled in the art.

Another specific embodiment of the system of this invention is shown in FIG. 12. In this embodiment, first light beam 26, emitted from light source 20, is projected upwardly through the planes of rotation of the whirling blades.

The means for transmitting a second light beam through the planes of rotation, as here embodied, comprises a second light source 20' disposed on the same side of the planes of rotation of the blades as light source 20. Light source 20' projects a second light beam 28 upwardly through the paths of rotation of the blades at an angle $\theta$ with respect to light beam 26.

The light sensitive means, as here embodied, comprises two (2) light sensitive elements 22 and 22' disposed on the opposite side of the planes of rotation of the blades from light sources 20 and 20'. Light sensitive elements 22 and 22' receive second light beam 28 and first light beam 26, respectively, and are electrically connected in series so that an electrical signal is generated when the light beams impinge upon each element.

The system illustrated in FIG. 12 is similar to the system shown in FIG. 3, wherein the angle $\theta$ between light beams 26 and 28 is 60°, forming an equiangular triangle between light sources 20 and 20' and the light sensitive elements 22 and 22'.

Figure 13:
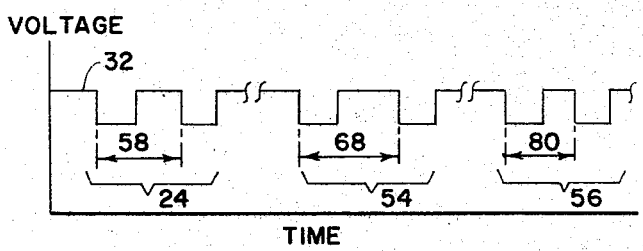
FIG. 13 is a diagrammatic illustration of the electrical signals generated by the system of FIG. 12.

The change in signal levels generated by light sensitive elements 22 and 22' is shown diagrammatically in FIG. 13. With blade 56 again describing a plane of rotation 77 vertically displaced above the optimum plane of rotation 23 described by blade 24, the time interval 80 between the initial and subsequent dropoff of the voltage for blade 56 is less than the time interval 58 for blade 24. With blade 54 describing a plane of rotation 55 vertically displaced below the optimum plane of rotation 23, the time interval 68 between the voltage drops is greater than the time interval 58 for blade 24. Hence, the vertical displacements 75 and 82 of blades 54 and 56, respectively, from the optimum plane of rotation 23 will be a function of the difference in time intervals between the blades 54 and 56 and the blade 24, as described above in connection with FIGS. 3–6.

In accordance with the invention, the source or sources of light provided emit a defined light beam which permits consistent and accurate indication of the time interval between intersections of the light beams by the blades regardless of ambient light and most weather conditions. As embodied, this source of light comprises a finely controlled and coherent source of light having a beam of very small diameter, with a minimum of divergence over the distance required for it to travel between the source of light and the light sensitive element. Preferred light sources are controlled laser lights 88 and 88', as schematically illustrated in the embodiments shown in FIGS. 5 and 12.

As is well known to those skilled in the art, the spontaneous radiation from excited atoms creates light. In a conventional light source, the overall wavelengths of light are produced as a jumble of waves from the numerous individual atoms. The wavelength of light from a particular atom thus is out of phase with the wavelength from any other atom, and hence the light is said to be incoherent.

In contrast to this, a laser beam is a controlled source of light of coherent wavelengths, wherein the waves of light emitting from the device are all in phase in one direct plane. The light is extremely directional, following the path exactly along the axis of the laser. A laser provides a fine monochromatic light beam which has negligible diffusion over the distance it is required to travel. It is capable of penetrating the worst weather conditions that can be encountered in tracking, such as fog, smog, snow, or the like.

A laser suitable for use in this invention may be, for example, a helium-neon gas continuous wave laser, fitted with an aperture to provide a beam of approximately 0.1 inch in diameter. Hence, a much finer reference line can be established than is possible with the relatively wide width of the ambient light rays used in the prior art devices, leading to greater accuracy in the blade tracking system of this invention. A laser is therefore a very stable source of nearly monochromatic optical frequency waves, and the output radiation of the laser forms a very powerful, narrow, and sharply directed beam of light.

In accordance with the intervention, light sensitive elements capable of generating a charge in an electrical signal are used to indicate the interruptions of the light beams by the blades. The light sensitive element may be a photoelectric cell emitting an electrical signal when light impinges upon it or it may act as a gate preventing passage of an electrical signal when light impinges upon it.

As embodied, the light sensitive elements are preferably photodiodes 89 and 89' schematically shown in the embodiments of FIGS. 5 and 12, adapted to sense the presence of light. A photodiode is a semi-conductor having electrical characteristics that are light sensitive. The photodiodes are normally housed in a container (not shown) designed to collect and focus the light admitted. When they are illuminated, the current generated is proportional to the amount of light falling on the photodiode, and therefore they are not only capable of detecting the presence of light, but can also be used to measure light intensity.

To determine the relative blade tracking positions of rotating helicopter blades, suitable framework as shown in FIG. 7 may be provided for mounting the system of this invention. FIG. 7 illustrates a common type of helicopter 90 embodying a single system of rotors. However, the use of such a helicopter is by way of example only, since helicopters with tandem rotor systems or rotors of a varying number of blades lend themselves equally well to this system for blade tracking.

A framework 92 is provided to dispose the necessary elements of the system in the desired angular relationship, such as, for example, the embodiment of FIG. 3. For convenience, the framework will be described as it relates to the embodiment shown in FIG. 3, but it will readily be apparent that the framework may easily be altered to accommodate the embodiments shown in FIGS. 5 and 12.

Frame 92 includes an adjustable means for adjusting the vertical height of the system. In the particular embodiment shown, the frame is adjusted by telescoping the lower legs 94 into the framework 92. Means are also provided for locking legs in place at the desired height. Preferably, the framework is mounted on rollers 96, so that the system can easily be rolled into place adjacent the blades of the helicopter.

A laser light 88 is mounted on the framework, as shown in FIG. 7, to direct first or primary light beam 26 at a 60° angle, for example, with respect to the ground. A beam deflector 86 is mounted onto the framework on the end of strut 98 and is positioned to deflect primary light beam 26 at a 60° angle, thereby providing the second or deflected light beam 28 directed downwardly and onto photodiode 89 mounted on the frame as shown in FIG. 7.

The electronic unit used with photodiode 89 to indicate the interval between interruptions of light beams and therefore the vertical displacement of the blades is generally indicated at 100. Readout unit 100 is conveniently mounted on frame 92 for easy reference by the operator of the system, and is connected through cable 102 with a phase detector means 104 mounted on the aircraft 90 for indicating and integrating the sequence of the blades into the readout system.

The phase detector 104 may be of any conventional type well known to those skilled in the art and forms no part of this invention. A suitable phase detector, as shown in FIG. 7, includes a magnetic pickup 106, comprising a coil wound magnet mounted to a bracket 108 on the stationary housing of the rotor. A magnetic impulse bracket 110 is secured to the rotor so that it passes relatively close to the magnetic pickup 106. When the bracket 110 passes over the pickup, a signal pulse is emitted, and, because the location of the bracket 110 with respect to the blades is known, the phase of the blades can be correlated with the signal changes from photodiode 89. Cable 102 transmits this pulse to readout device 100 integrating it into the system so that the interval indicated will be related to the proper blade.

With reference to FIG. 7, the system shown therein for tracking rotating helicopter blades while the aircraft is on the ground will now be described. For the sake of convenience, the operation of the system with respect to the fore rotor will be described, but it is to be understood that the same system can be used for tracking the blades of an aft rotor system as well. It is immaterial whether the blades initially interrupt the first or primary light beam 26 or the second or deflected light beam 28, and therefore the system is equally adaptable to both the fore and aft rotors which rotate in opposite directions.

Additionally, the tracking system of this invention may be used with a whirl tower (not shown) wherein the blades to be tracked are secured to the rotor of a fixed installation or tower, thereby avoiding the necessity of tying up a helicopter to run the tests. The tracking system may include either the portable framework 92, depicted in FIG. 7, or a permanent installation operatively positioned with respect to the whirl tower.

When it is desired to track blade position, the system is adjusted vertically until the maximum vertical displacement of the plane of rotation of the blades occurs between beam deflector 86 and laser 88 and photodiode 89. For example, if the blade is 25 feet in length, the maximum coning of the blade during rotation is approximately 40 inches from its lowest to its highest point, and if the blade is 30 feet in length, the maximum coning is approximately 50 inches. The frame should be adjusted so that beam deflector 86 will be placed well above the maximum coning of the blades during rotation.

The frame 92 is then rolled into position so that the tip of the blades will interrupt the light beams during rotation, without interfering with the framework. The cable 102 is then connected to the helicopter 90 at a suitable outlet 112 to integrate the sequence of the blades into the system, and the rotor is started and run to approximately 230 r.p.m., for example. As the blades intersect the light beams, a change in the voltage level occurs in the photodiode, which can be diagrammatically illustrated, as shown by line A of FIG. 9.

A master blade is tracked first to establish the proper time interval between beam interruptions at the optimum plane of rotation. The master blade is then removed from the system and three production blades in a three-bladed rotor system, for example, are tracked simultaneously by comparing the results of these blades to the results established by the master blade.

FIG. 8 indicates schematically, in block diagram form, a system for reading the voltage changes from photoelectric cell or photodiode 89 used in the embodiments shown in FIGS. 3 and 5. The signals generated by the cell are first amplified, by any suitable means 120 well known to those skilled in the art, to amplify the sharp drop in signal input, rejecting any sharp increases and forming sharp pulses 123 to designate the beginning and end of each interval, as shown in line B of FIG. 9. These pulses 123 are then fed to a precision gate generator or flip-flop circuit 122 for gating pulses 123 which produces a pulse 124 equivalent to the time interval of the blade track.

The first pulse from amplifier 120 sets circuit 122 in one direction producing an increase in voltage and putting the voltage at a constant level, as shown in line C of FIG. 9. The second pulse sets circuit 122 in the opposite direction, restoring the voltage level to its initial position. Thus, the output of the flip-flop is a series of square pulses 124, as indicated in line C of FIG. 9, wherein the width of the pulse is a measure of the time interval between interruptions of the light beams by a particular blade.

These precision pulses of constant amplitude can then be fed into any suitable means well known to those skilled in the art, such as a digital readout printer, to indicate the interval between the interruption of the light beams by any particular blade in either time or distance, to indicate the actual vertical displacement characteristics as a function of the interval, and to provide a permanent record of the tracking of the blades of the rotor.

Phase detector 104, which emits a reference pulse, is provided to ensure correct phasing of the system so that each pulse 124 fed to the readout will be related to a particular blade of the rotor. The phase detector forms an identification pulse 126, as indicated in line D of FIG. 9. This pulse is then integrated into the system by feeding it into the readout mechanism 100 through cable 102 which separates the pulses 124 from line C into the proper sequence, so that vertical displacement characteristics of the individual blades can be properly correlated.

To be certain that the blades are in track with the optimum plane of rotation, the following procedure is recommended. At least ten (10) passes are made for each blade through the dual light beams and the average interval of these passes is recorded. This procedure is repeated ten (10) times so that, in effect, 100 passes have been made for each blade, with ten (10) averaged readings for each blade. If, for example, seven (7) of these averaged intervals are identical to the interval of a blade tracking at the optimum plane of rotation, the blades are in the proper track. As discussed above, by taking the difference in the time intervals, the actual vertical displacement of the blade from the optimum plane of rotation can be determined. Furthermore, if it is desired, the vertical displacement of any blade from a particular fixed plane of reference, such as the beam deflector or the ground, can be determined with equal accuracy.

FIG. 10 illustrates schematically, in block diagram form, an alternative system for reading the signal changes from the light sensor 89 used in the embodiment shown in FIGS. 3 and 5 as a function of the displacement characteristics of the rotating blades. The light sensor, which may, for example, operate as a gate, transmits a negative pulse to a signal amplifier 120 which reforms and amplifies the pulse to form sharp pulses designating the beginning of each beam interruption. The first pulse is then fed to flip-flop circuit or gate generator 122 for gating the pulses from the amplifier, the gated pulse turning on a NAND gate 127 and permitting a constant pulse from a signal generator 128 to enter a pulse counter 129.

The pulses from generator 128 are counted until the blade interrupts the other light beam, when the second pulse from the amplifier sets the gate generator in the opposite direction, turning off the NAND gate and stopping the flow of pulses from signal generator 128 to the counter. The counter is automatically reset between blades to permit counting of the pulses for each blade. The number of pulses from signal generator 128 within the time span between beam interruptions is therefore indicative of the vertical displacement characteristics of the blade and the higher the frequency rating of the signal generator, the higher the accuracy of the system. Using a 100 kilocycle pulse generaor, vertical displacements of the plane of rotation of a blade from an established plane of reference of at least 0.3 inch were detectable with the system described in FIG. 10. Phase detector 104 is also provided to ensure correct phasing of the system, as described above.

While a light sensor acting as a gate in combination with a NAND gate has been described in connection with this system for reading the signal changes from the light sensor, it will, of course, be understood that a light sensitive element emitting a positive pulse in combination wtih an AND gate may also be used in this readout system of this invention.

Figure 14:
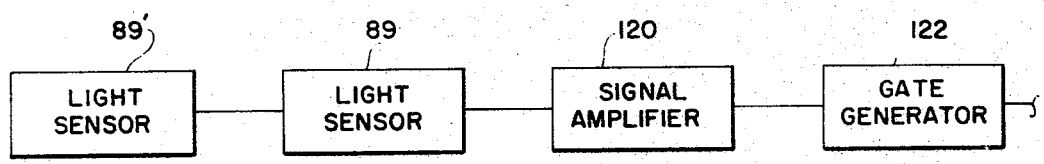
FIG. 14 is a schematic block diagram representing a system for reading the signals generated by the tracking system of FIG. 12.

The systems, schematically illustrated in FIGS. 8 and 10, for reading the signal changes from light sensor 89 can also be used for reading the signal changes from light sensors 89 and 89' used in the embodiment of this invention illustrated in FIG. 12. As shown in FIG. 14, light sensors 89 and 89' are electrically connected in series to signal amplifier 120, so that an electrical signal is transmitted to the amplifier when light beams 26 and 28 impinge upon light sensors 89' and 89, respectively.

The light sensors act as gates, so that when either light beam is interrupted by a whirling blade, a negative pulse will be transmitted to signal amplifier 120. The negative pulses are reformed and amplified by amplifier 120 to form sharp pulses designating the beginning of each beam interruption. The sharp pulses are fed to a gate generator 122 similar to that shown in FIGS. 8 and 10 to produce a gated pulse equivalent to the time interval of the blade track. The gated pulses can then either be transmitted to the readout mechanism 100 in the system illustrated in FIG. 8, or to the NAND gate 127 in the system illustrated in FIG. 10.

Instead of a readout computer for indicating vertical displacement as a function of the interval between interruptions of the light beams, an oscilloscope may advantageously be used to provide a graphic picture of the trace of the voltage characteristics, based on the interruption of the light beams by the blades. A scope readout, as shown in FIG. 11, would be desirable in connection with a system oriented, as shown schematically in FIG. 5. It will readily be apparent that the system illustrated in FIG. 12 may also be oriented to that shown in FIG. 5.

In this particular system, the angle $\theta$ would be 45° with one of the beams, either the second or deflected beam or the first or primary beam, forming a path normal with the plane of rotation of the blades. Blade 24 would trace a pattern on the face of the scope 130, as shown in FIG. 11. The two vertical trace lines 132 and 134 of FIG. 11 represent the sequential voltage cutoff produced by the interruption of the light beams by the leading edge of blade 24. Since the initial light beam interrupted is vertical and the path of rotation of the blades is horizontal, the initial voltage cutoff 132 can be made to occur on the scope at the same point for each by adjusting the scope so that the time coordinate on the screen is equal to the distance of travel of a blade through one segment or 120° for a three-bladed rotor. Blade 54 tracking below blade 24 will then form an identical trace on the scope up to the point of interruption of the second beam, with the voltage cutoff drop there being represented by line 136. This dropoff will occur beyond the second voltage cutoff 134 of blade 24 and the voltage level will rise to full voltage again beyond the voltage rise of the blade, as shown in FIG. 11.

The time interval for interruption of the light beams by blade 24 is the distance 138 between the initial 132 and subsequent drop 134 in voltage. The difference between established time interval 138 for blade 24 tracking at the optimum plane of rotation and the time interval 140 for blade 54 is the distance 142, which is a function of the vertical displacement between the two blades, as described above. Since the angle between the beams is 45° and the angle between first or primary beam 26 and the plane of rotation is also 45°, horizontal displacement 142 representing the difference in the time interval is directly proportional to the vertical displacement 75 of the blade being tracked from the optimum plane of rotation of blade 24. A suitable time delay mechanism is necessary to superimpose the voltage trace of blade 24 on the scope simultaneously with the voltage traces of the other blades, so that comparisons between the traces can be made. By placing a suitably calibrated graticule 150 over the screen of the scope 130, the actual vertical displacement can be read directly in fractions of an inch.

In the same manner, blade 56 tracking above the plane of rotation 23 of blade 24 produces a similar graphical representation on the screen of the scope with the subsequent voltage cutoff being represented by line 146. The time difference 148 between the dropoff 134 in voltage of blade 24 and the subsequent dropoff 146 in voltage of blade 56 is indicative of the vertical displacement between blade 24 and blade 56 being tracked in the same manner described above.

In accordance with the invention, a new, improved, and precise method and system for measuring the vertical displacement of whirling helicopter blades from an optimum plane of rotation has been provided utilizing a beam of energy and more preferably a single and finely controlled light beam that passes through the plane of rotation of the blades at two distinct places and at a specific angle to each other. By this arrangement, the tracking system is no longer dependent upon the existence of ambient light and is completely independent of surrounding conditions, both as to variations in ambient light and most types of weather conditions. With the system of this invention, it is unnecessary to provide external light sources, and hence the tracking of blades can be carried out at any time of the day or night including the periods when the sun is rising or setting.

Since a highly resolved and finely controlled source of light is used in the preferred embodiment, a more precise method of tracking is provided by establishing a nearly finite line of reference. Furthermore, the cost of such a system allows a saving of up to 20% over prior art optical systems, with an increase in accuracy and reliability. Because of the relatively few number of operating parts, maintenance costs are also appreciably lower than in prior art devices.

The invention in its broader aspects is not limited to the specific details shown and described, but departures may be made from such details within the scope of the accompanying claims without departing from the principles of the invention and without sacrificing its chief advantages.

What is claimed is:

1. A device for measuring the displacement characteristics of the path of a moving object from an established plane of reference comprising: a source of energy for transmitting a first defined beam of coherent energy through a path of the moving object; means for transmitting a second defined beam of coherent energy through the path of the moving object at an angle to the first beam; energy responsive means receiving at least one of the energy beams, which means is responsive to interruptions of either energy beam by the moving object; and indicating means connected to the energy responsive means for indicating the interval between sequential interruptions of the two beams by the moving object as a function of the displacement characteristics of the path of the moving object with respect to the established plane of reference.

2. The tracking device of claim 1, wherein the source of light is a laser light.

3. The tracking device of claim 2, wherein the laser light is a helium-neon gas continuous wave laser having a light beam diameter of approximately 0.1 inch.

4. A tracking device for a rotating object comprising: a source of light emitting a first defined beam of coherent light through the path of rotation of the object; means for transmitting a second defined beam of coherent light through the path of rotation of the object at an angle to the first beam; light sensitive means receiving at least one of the light beams and producing a change in an electrical signal whenever either beam is interrupted by the rotating object; and indicating means connected to the light sensitive means for indicating the interval between changes in the electrical signal caused by the sequential interruptions of the two beams by the object as a function of the displacement characteristics of the rotating object with respect to an established plane of reference.

5. The tracking device of claim 4, wherein the light beams form a 60° angle with respect to each other and with respect to the path of rotation of the object.

6. The tracking device of claim 4, wherein the light beams form a 45° angle with respect to each other and one of the light beams is normal to the path of rotation of the object.

7. The tracking device of claim 4, wherein the second defined beam of light is a deflected light beam and the means for transmitting the second defined beam of light comprises a deflector that receives the first defined beam of light on the opposite side of the path of rotation of the object from the light source and deflects the beam back through the path of rotation at an angle to the first beam, said light sensitive means being on the same side of the rotating object as the light source and receiving the deflected light beam.

8. The tracking device of claim 7, wherein the light sensitive means includes a photodiode that emits a constant electrical signal except when one of the beams is interrupted by the rotating object.

9. The tracking device of claim 4, wherein the means for transmitting the second defined beam of light comprises a second source of light emitting the second defined beam of light through the path of rotation of the object at an angle to the first beam, said light sensitive means receiving both of the light beams.

10. The tracking device of claim 9, wherein the sources of light are laser lights.

11. The tracking device of claim 10, wherein the laser lights are helium-neon gas continuous wave lasers having a light beam diameter of approximately 0.1 inch.

12. The tracking device of claim 9, wherein the light sensitive means includes two photodiodes electrically connected in series and each receiving one of the light beams, said photodiodes emitting a constant electrical signal except when one of the beams is interrupted by the rotating object.

13. The tracking device of claim 4, wherein the rotating object is any one of a plurality of rotating blades.

14. The tracking device of claim 13, wherein the sequential interruption of the two beams by each blade produces a pair of successive electrical signals and the indicating means includes means for gating said pairs of successive signal changes to produce a pulse equal in width to the elapsed time interval between the successive signal changes, readout means for indicating the vertical displacement of the plane of rotation of each blade as a function of said pulse width, and phasing means including a source of reference signals connected to the readout means for indicating the pulse associated with each blade.

15. The tracking device of claim 13, wherein the indicating means includes pulse generating means, counting means, and means for gating successive signal changes from the light sensitive means to control the input of pulses from the pulse generating means to the pulse counting means.

16. The tracking device of claim 13, wherein the indicating means plots the electrical signal characteristics as a function of time.

17. The tracking device of claim 16, wherein the indicating means is an oscilloscope.

18. The tracking device of claim 17, including a calibrated graticule on the screen of the oscilloscope that indicates the vertical displacement of the path of rotation of the blades as a function of the time interval occurring between the changes in the electrical signal caused by any one blade interrupting the light beams.

19. A tracking device for helicopter blades to indicate vertical displacement characteristics of the individual blades comprising a source of light emitting an upwardly directed primary and defined beam of coherent light at a 60° angle to and through the plane of rotation of the blades, a beam deflector disposed above the plane of rotation of the blades adapted to deflect the beam downwardly at a 60° angle to the primary light beam and back through the plane of rotation of the blades, a photosensitive element axially aligned with the deflected beam producing a constant voltage signal except when either beam of light is interrupted by a rotating blade and means connected to the photosensitive element for indicating the interval between voltage signal changes by the sequential interruptions of the beams by any one blade, the elapsed interval being a function of the vertical displacement of the plane of rotation of the individual blades from an established plane of reference.

20. A method for indicating the displacement of the path of a moving object from an established plane of reference, which comprises directing a first defined beam of coherent energy through the path of the moving object, directing a second defined beam of coherent energy through the path of the moving object at an angle to the first beam, receiving at least one of the beams of energy in a means responsive to interruptions of either energy beam by the moving object, and plotting the interruptions with time so that the interval between successive interruptions of the two beams by the moving object is a function of its displacement from the established plane of reference.

21. A method for tracking a rotating object to indicate the vertical displacement of the path of rotation of the objects which comprises directing a first defined beam of coherent light through the path of the rotating object, directing a second defined beam of coherent light through the path of rotation at an angle to the first beam, receiving at least one of the beams of light in light sensitive means responsive to interruptions of either light beam by the object, and plotting the interruptions with time so that the interval between successive interruptions of the two beams by the object is a function of the vertical displacement of the object from an established plane of reference.

22. The method of claim 21 for tracking a plurality of rotating objects, wherein one beam of light is directed upwardly at a 45° angle to the paths of rotation of the objects and the other beam is normal to the paths so that the difference in the linear distance between the two interruptions of the light beams by any two objects is equal to the vertical distance between the paths of rotation of the objects.

23. The method of claim 21, wherein one beam of light is directed upwardly at a 60° angle to the path of rotation of the object and the other beam is at a 60° angle to the first beam.

24. The method of claim 21, wherein the second beam of light is directed through the path of rotation by deflecting the first light beam after it passes through the path of rotation of the object back through the path of rotation of the object at an angle to the first beam, said second beam of light being received by the light sensitive means.

25. The method of claim 21, wherein the first and second beams of light are directed through the path of rotation of the object from two separate sources of light, each of said beams being received by the light sensitive means.

26. The method of claim 21, wherein the rotating object is any one of a plurality of rotating blades.

References Cited

UNITED STATES PATENTS

| | | | |
|---|---|---|---|
| 2,960,908 | 11/1960 | Willits et al. | 356—28 |
| 3,002,420 | 10/1961 | Willits et al. | 356—167 |
| 3,301,071 | 1/1967 | Shalloway. | |
| 3,307,164 | 2/1967 | Zimmer | 324—70 XR |
| 3,386,031 | 5/1968 | Able et al. | 73—455 XR |

FOREIGN PATENTS

| | | |
|---|---|---|
| 1,188,816 | 3/1959 | France. |
| 520,813 | 3/1931 | Germany. |

JAMES J. GILL, Primary Examiner

U.S. Cl. X.R.

356—28, 167